March 24, 1936.  H. P. MAY  2,035,084
AMUSEMENT DEVICE
Filed Feb. 21, 1934  8 Sheets-Sheet 1
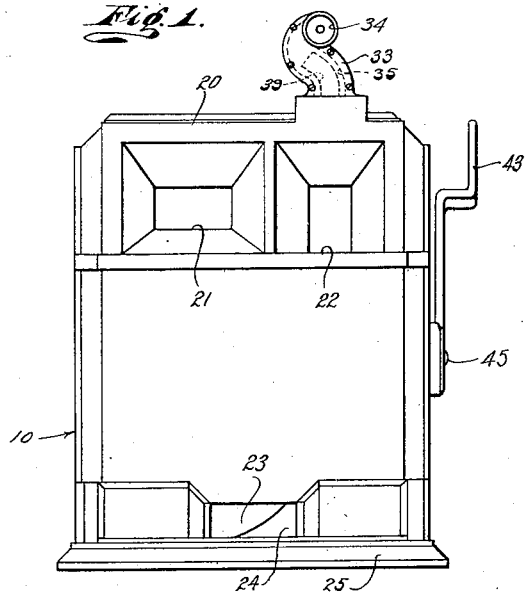
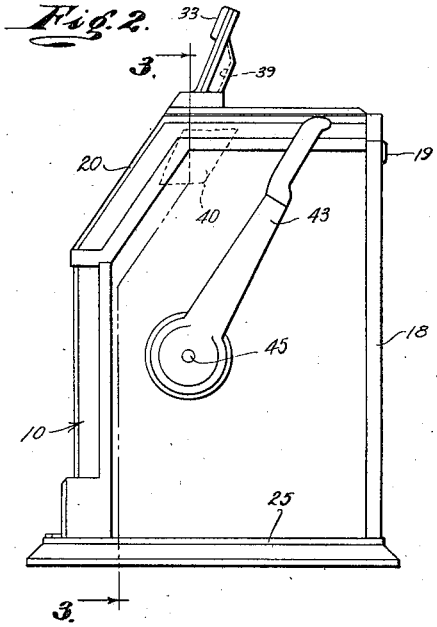
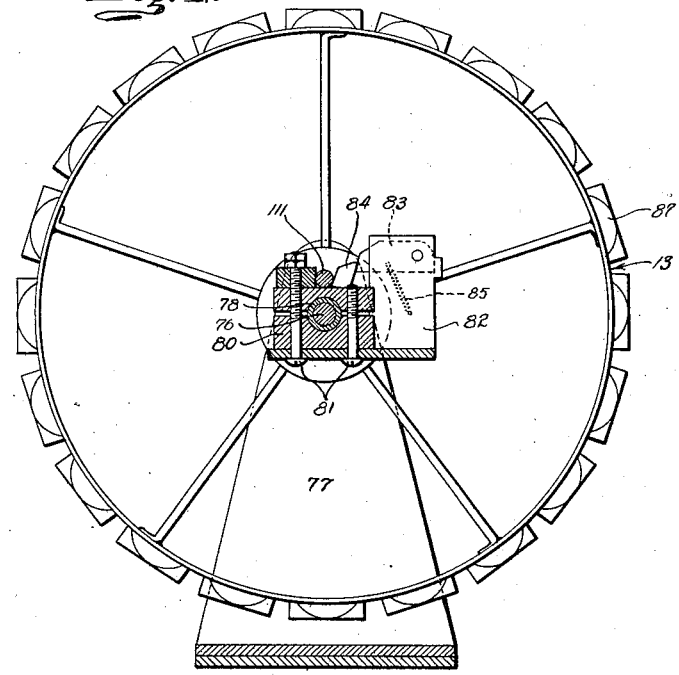
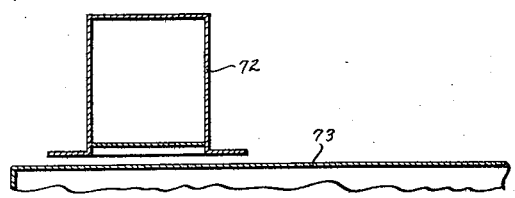
Inventor
HARRY P. MAY
By
His Attorney

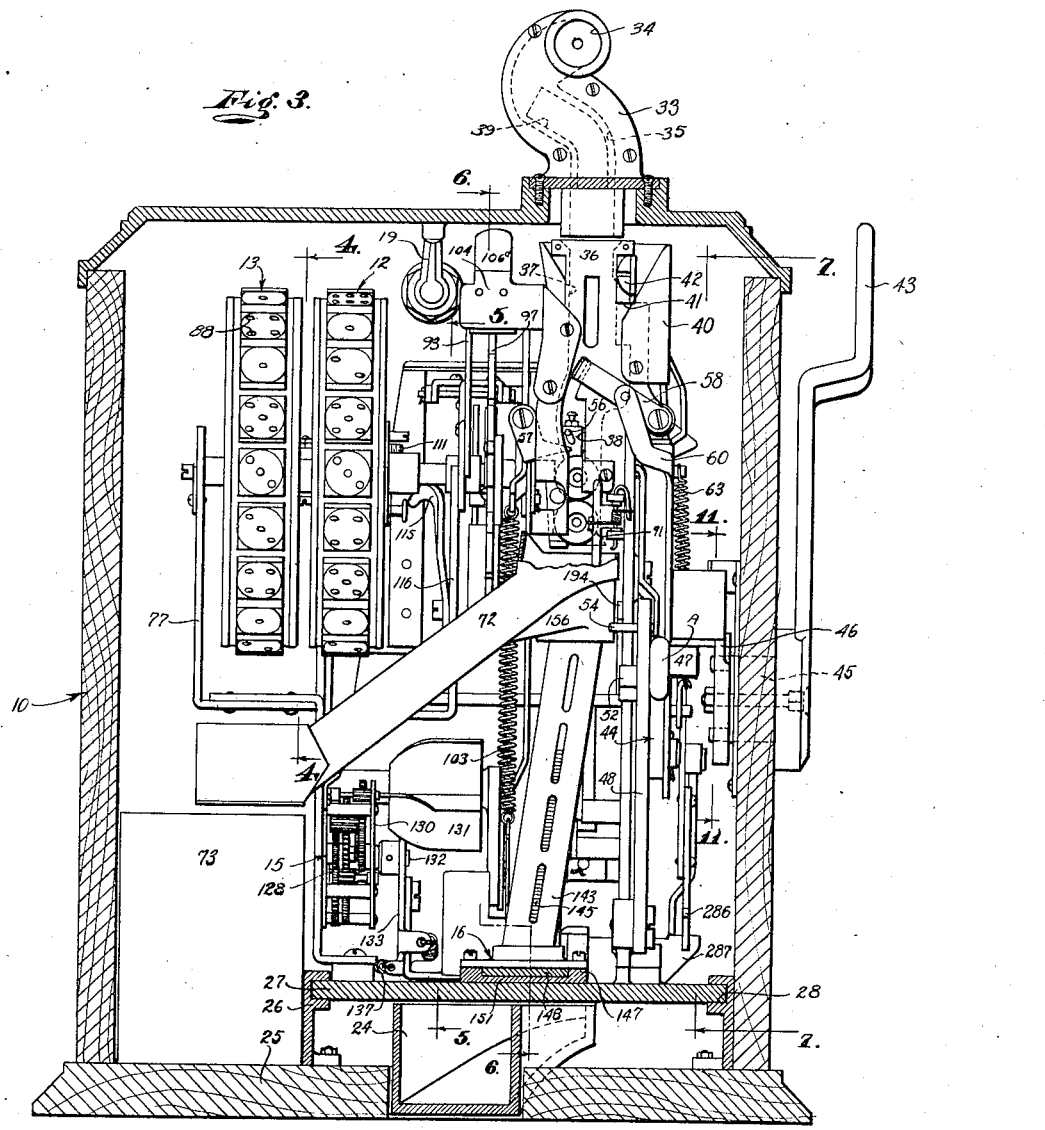

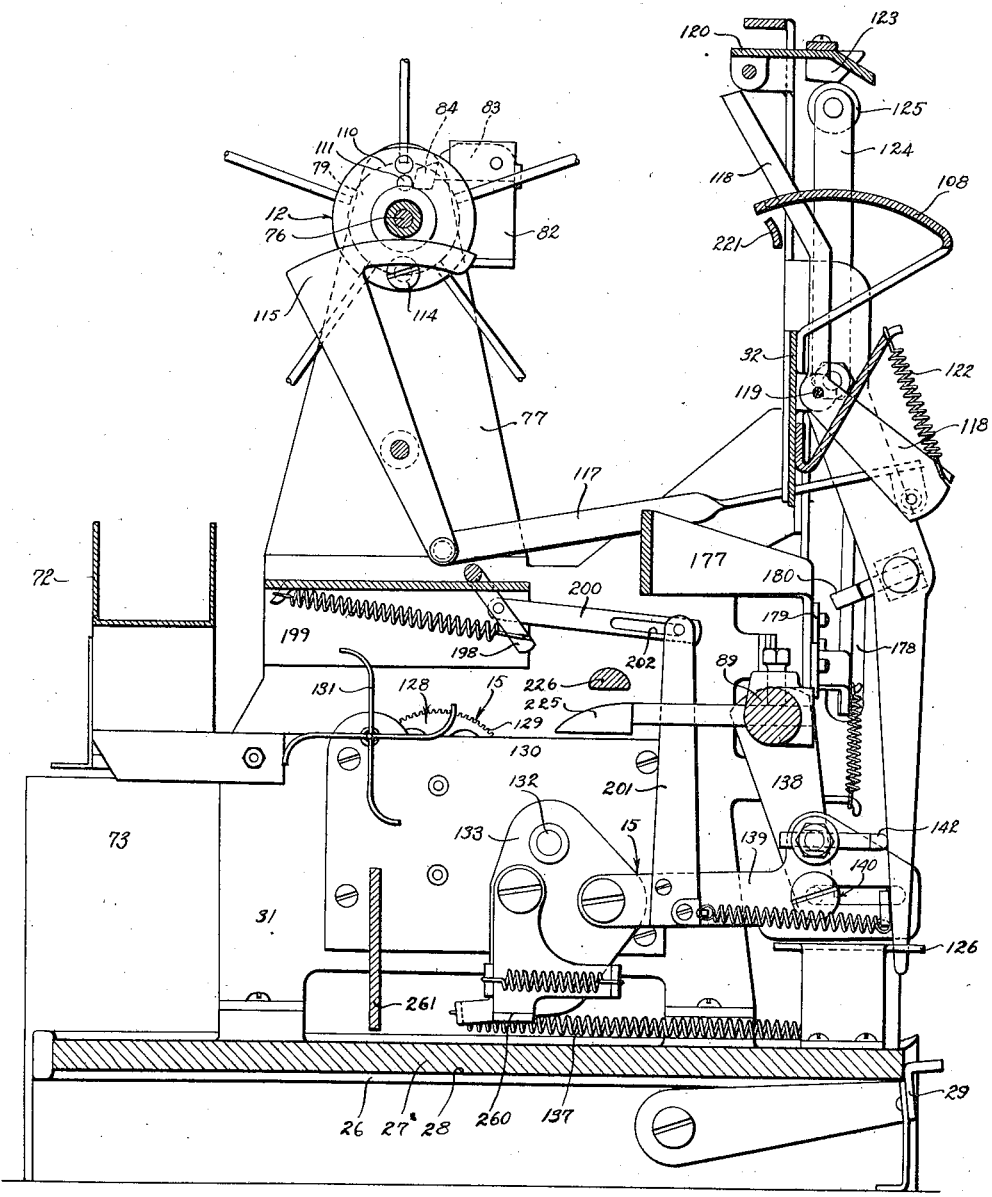

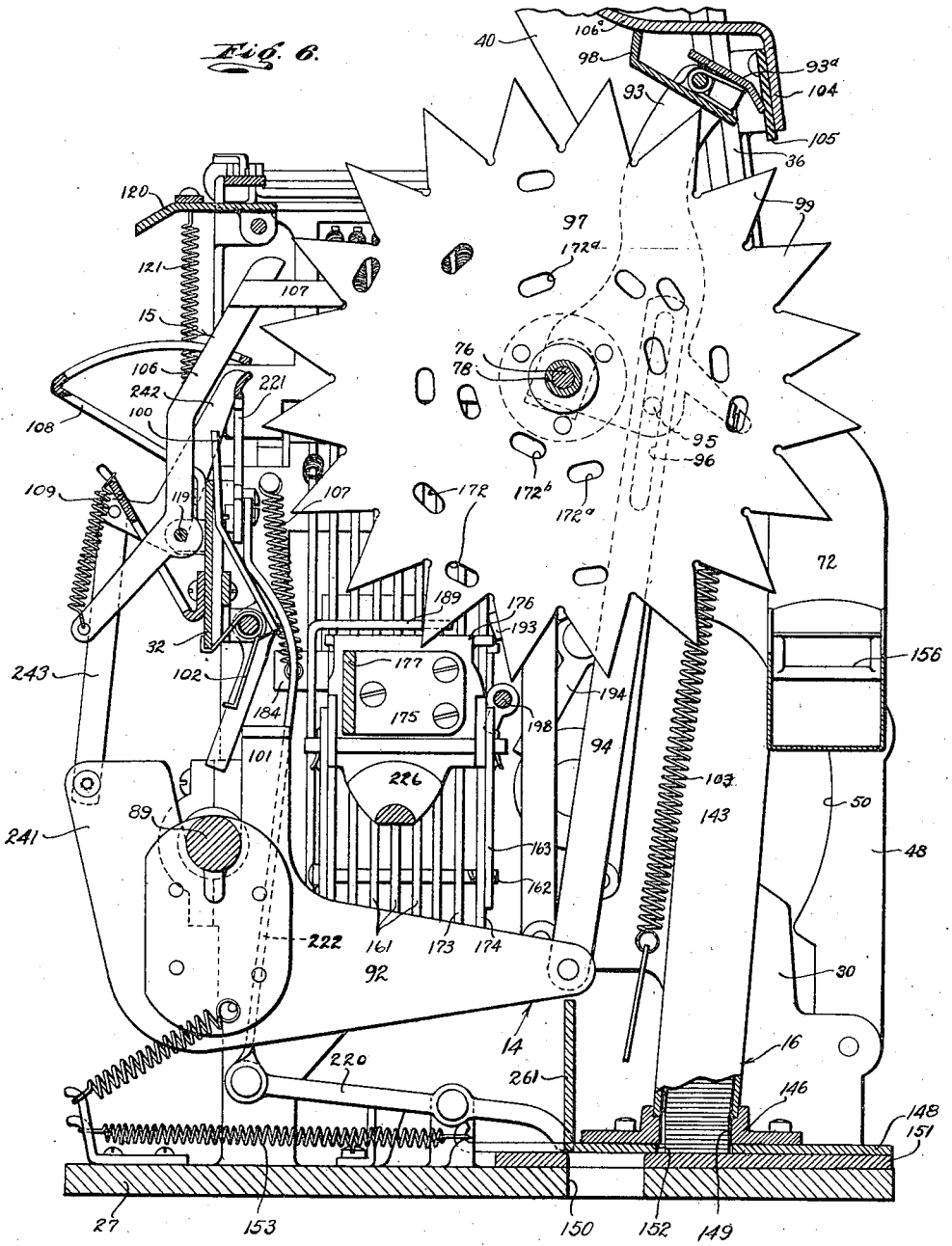

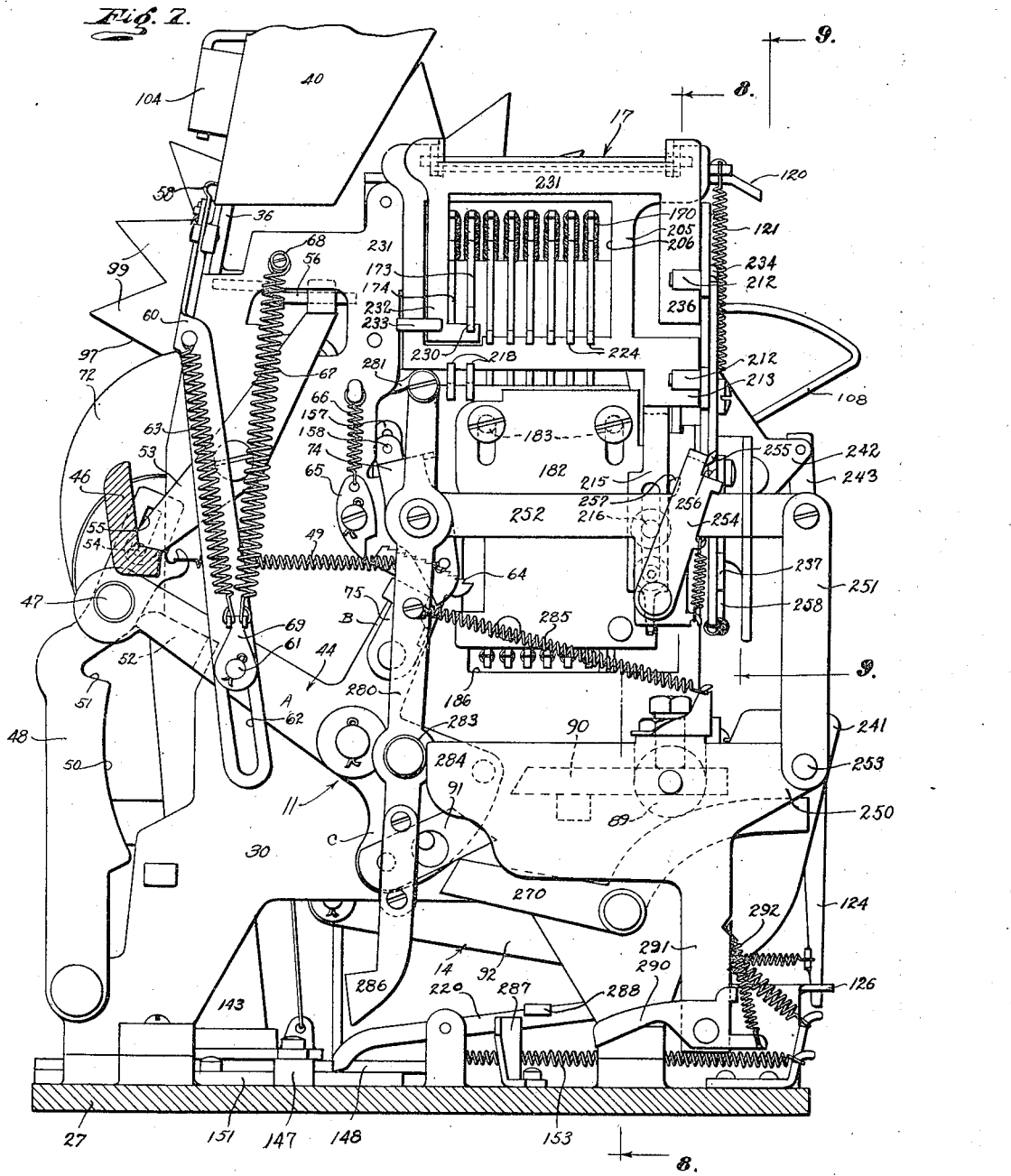

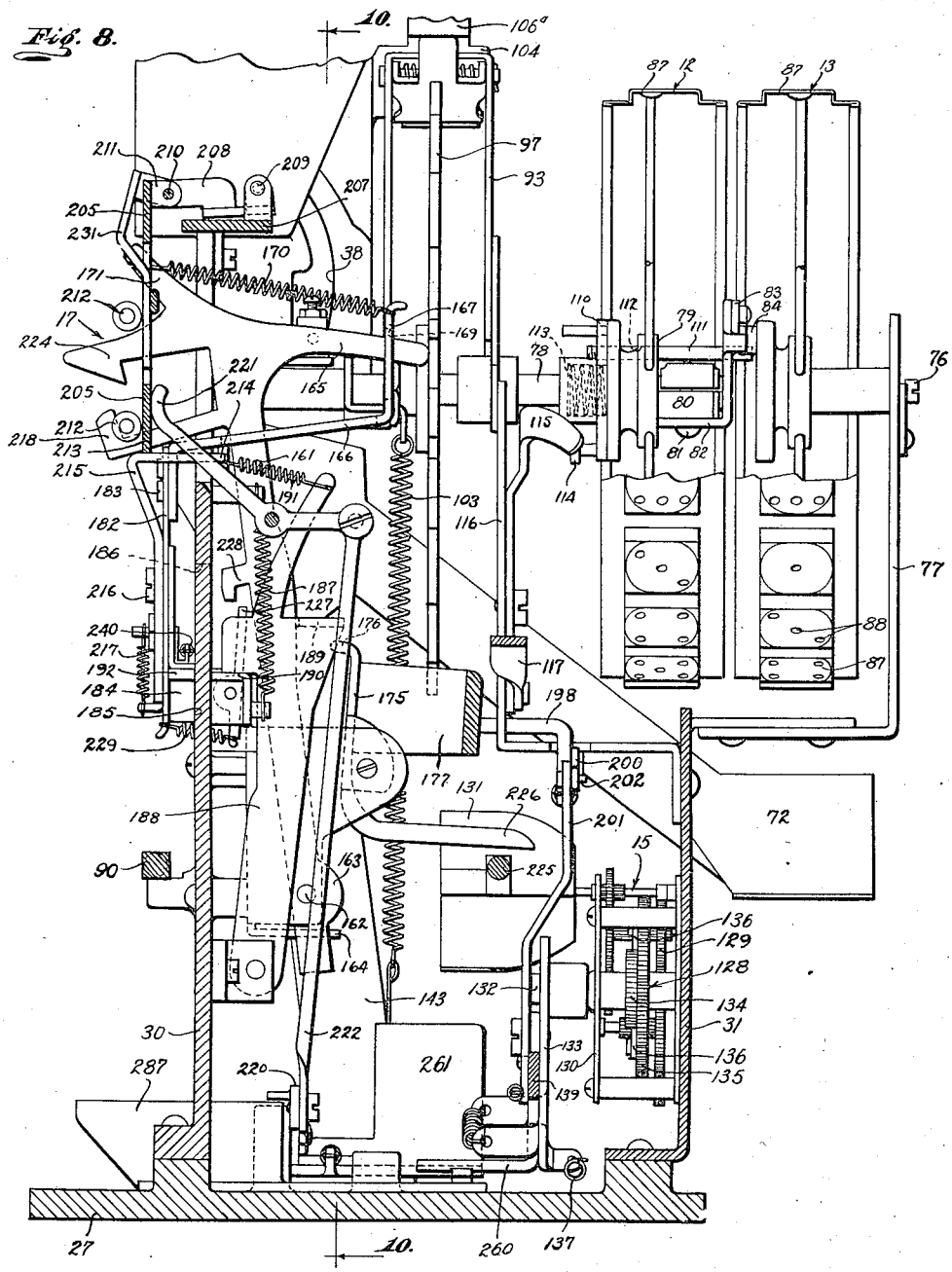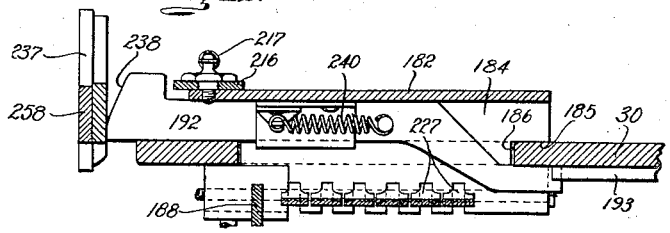

March 24, 1936.  H. P. MAY  2,035,084
AMUSEMENT DEVICE
Filed Feb. 21, 1934  8 Sheets-Sheet 7
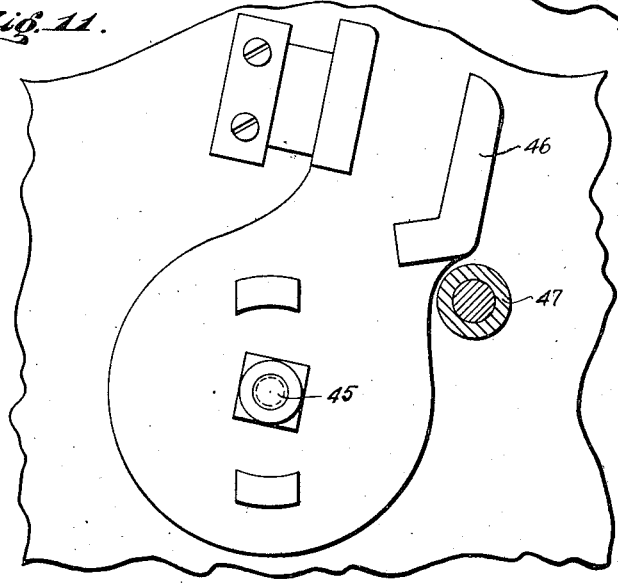

March 24, 1936.   H. P. MAY   2,035,084
AMUSEMENT DEVICE
Filed Feb. 21, 1934   8 Sheets-Sheet 8

Fig. 10.

Inventor
HARRY P. MAY
By
His Attorney

Patented Mar. 24, 1936

2,035,084

UNITED STATES PATENT OFFICE 2,035,084

AMUSEMENT DEVICE

Harry P. May, Los Angeles, Calif., assignor to Leo M. Harvey, La Canada, Calif., as trustee Application February 21, 1934, Serial No. 712,331

9 Claims. (Cl. 273—143)

This invention relates to mechanisms and has particular reference to mechanical movements or mechanisms adapted for embodiment in amusement devices and other machines. A general object of this invention is to provide a practical effective mechanism that is compact and that is positive and effective in operation.

Another object of the invention is to provide a mechanism including an efficient operative combination that is adapted to function as a controlling or governing means.

The mechanism of the present invention is capable of employment or embodiment in machines and devices of various characters and in machines having various functions and purposes. For the purpose of example, I will herein set forth a typical form of the invention embodied in an amusement device, it being understood that the invention is not to be construed as limited for use in the particular application or device set forth herein, but is to be taken as including any features or modifications that may fall within the scope of the claims.

Another object of the invention is to provide mechanism for an amusement device or other machine that includes two wheels that rotate independently when the device is operated and that stop in various different rotative positions relative to a stationary object but always stop in the same rotative position with relation to one another.

A further object of the invention is to provide a mechanism of the character mentioned that is entirely self-contained and that is embodied in a comparatively small, compact unit which may be housed in a suitable case.

Other objects and features of the invention may become apparent from the following detailed description of a typical preferred embodiment of the invention, throughout which description reference will be had to the accompanying drawings, in which:

Fig. 1 is a front elevation of a device embodying the invention.

Fig. 2 is a side elevation of the device illustrating the operating handle in the unactuated position.

Fig. 3 is an enlarged vertical detailed sectional view taken substantially as indicated by line 3—3 on Fig. 2, illustrating the principal parts of the mechanism in front elevation.

Fig. 4 is an enlarged vertical detailed sectional view taken as indicated by line 4—4 on Fig. 3.

Fig. 5 is an enlarged vertical detailed sectional view taken substantially as indicated by line 5—5 on Fig. 3 with portions of the dice wheels removed.

Fig. 6 is an enlarged vertical detailed sectional view taken substantially as indicated by line 6—6 on Fig. 3.

Fig. 7 is an enlarged end elevation of the mechanism being a view taken substantially as indicated by line 7—7 on Fig. 3 and illustrating certain parts in vertical cross section.

Fig. 8 is a vertical detailed sectional view taken as indicated by line 8—8 on Fig. 7.

Fig. 9 is a fragmentary rear or side elevation of the principal mechanism being a view taken substantially as indicated by line 9—9 on Fig. 7.

Fig. 10 is a vertical detailed sectional view taken as indicated by line 10—10 on Fig. 8.

Fig. 11 is an enlarged fragmentary vertical detailed sectional view taken substantially as indicated by line 11—11 on Fig. 3.

Fig. 12 is a transverse fragmentary detailed sectional view taken as indicated by line 12—12 on Fig. 9.

The machine or amusement device illustrated in the drawings and embodying the mechanism provided by the present invention includes, generally, a case 10, coin or token controlled operating means 11, rotatable dice wheels 12 and 13, an operating drive 14 between the means 11 and the dice wheels, delayed means 15 for stopping rotation of the wheels 12 and 13, dispensing means or pay-off means 16, a control 17 for the operating means 11 and the pay-off means 16 whose action is governed or determined by the rotative position of the stopped wheels 12 and 13, and various other parts and mechanisms the details of which will be subsequently described.

The cabinet or case 10 may be varied considerably in style and construction without departing from the invention. The particular case 10 illustrated in the drawings is a substantially rectangular structure having a removable back 18. A lock 19 may be provided to lock the back 18 in position and thus normally render the interior of the case 10 inaccessible. The forward upper corner portion 20 of the case 10 may be sloping or inclined as clearly illustrated in Fig. 2 of the drawings. Sight openings 21 and 22 are provided in this sloping portion 20 of the case and are closed by glass or other transparent material. A coin or token discharge opening 23 is provided in the front of the case 10. A chute 24 is arranged on the bottom 25 of the case to carry the coins and tokens to the opening 23. A frame or chassis is removably arranged in the case 10 to carry the various parts and mechanisms of the device.

Spaced tracks or supporting rails 26 are provided on the bottom 25 of the case for carrying the chassis. The chassis includes a horizontal base 27 whose opposite edge portions are slidably received in grooves 28 in the rails 26. One or more latches 29 may be provided to releasably hold the base 27 in position on the rails 26. Upstanding plates 30 and 31 are provided on the base 27 adjacent its opposite side edges. A transverse plate 32 extends between and connects the plates 30 and 31. The supporting chassis includes various other brackets and supporting elements.

The coin controlled operating means 11 operates or rotates the dice wheels 12 and 13 through the drive 14. The operating means 11 is governed or controlled by a coin or token control at certain stages of operation of play and is governed by the control 17 during other phases of operation or play. In accordance with the invention the operating means 11 includes coin and token receiving and handling devices. A coin or token receiving chute 33 projects from the top of the case 10. An opening 34 is provided in the front of the chute 33 to communicate with a downwardly and forwardly inclined coin and token passing channel 35. The channel 35 is preferably curved as illustrated in Fig. 1 of the drawings. A downwardly and forwardly inclined fixture 36 is provided on the chassis plate 30 and has a coin or token passing channel 37 whose upper end is in communication with the channel 35 of the chute 33. A slot 38 is provided in the fixture 36 to intersect the channel 37 and render the coins and tokens in the channel visible through the sight opening 22. Means may be provided in connection with the device for sidetracking or diverting undersized coins and objects that may be introduced into the opening 34. A vertically extending opening 39 of reduced width joins the channel 35 at its back wall. The lower end of the opening 39 discharges into a cup 40 on the fixture 36. Small objects or undersized coins, tokens, etc., passed into the channel 35 fall through the opening 39 and are received in the cup 40. A longitudinally extending slot 41 is provided in the fixture 36 to communicate with an edge or side wall of the channel 37. The slot 41 discharges into the cup 40 and a magnet 42 is positioned immediately above and outwardly of the slot 41 to draw iron slugs, etc. from the channel 37 through the slot so that they are trapped in the cup 40.

The coin controlled operating means 11 includes an operating handle or lever 43 at a side of the case 10 and a rocker 44 on the chassis within the case. The operating handle 43 is carried by a shaft 45 which projects into the interior of the case 10. A cam 46 is provided on the projecting inner end of the handle shaft 45. The rocker 44 has three arms, namely, the arms A, B, and C. The arm A of the rocker carries a roller 47 which is adapted to be engaged by the cam 46 when the operating lever 43 is pivoted downwardly and forwardly. The cooperation of the cam 46 with the roller 47 results in pivoting or turning of the rocker 44. This turning movement of the rocker 44 provides for the actuation of the dice wheels 12 and 13 through the medium of the operating drive 14.

Latch means governed by the coin mechanism and by the control 17 is provided to govern the operation of the rocker 44. A latch 48 has its lower end pivoted to the chassis plate 30 and projects upwardly beyond the rocker arm A. A spring 49 normally yieldingly urges the latch 48 toward the pivotal axis of the rocker. The inner edge 50 of the latch 48 is longitudinally curved to be normally substantially concentric to the axis of movement of the rocker 44. A notch 51 is provided in the curved edge 50 of the latch to receive a laterally projecting catch lug 52 on the rocker arm A. The lug 52 is received in the notch 51 to prevent actuating movement of the rocker 44 unless the latch 48 is rendered inoperative by the coin control mechanism or by the control 17.

The coin governed control for the latch 48 includes a lever 53 pivoted on the chassis plate 30 and carrying a pin 54 which operates in a slot 55 in the upper portion of the latch 48. The upper arm of the lever 53 projects laterally through an opening in the chassis plate 30 and carries a rod 56. The rod 56 extends forwardly and is adapted to be projected through the slot 38 into the coin passing channel 37. The rod 56 is located so that its forward end is adapted to engage the peripheral portion of a coin or token in the channel 37 and engagement of the rod with the token or coin prevents any substantial pivotal movement of the lever 53. When a proper coin or token has been inserted in the opening 34 to pass downwardly through the channel 35 into the channel 37 the operating handle 43 may be pulled downwardly and forwardly by the player so that the cam 46 engages the roller 47 to swing the rocker arm A downwardly. During the initial portion of this downward swinging of the rocker arm A the lever 53 is pivoted slightly so that its rod 56 strikes the coin or token in the channel 37 and the lever 53 is thus held against further pivotal movement. The cooperation of the slot 55 with the pin 54 on the stopped lever 53 holds the latch 48 against movement in a position where the lug 52 clears or passes the notch 51. The coin governed lever 53 thus temporarily renders the latch 48 inoperative to permit actuation of the rocker 44 by the cam 46 on the handle shaft. A spring held detent 57 is provided to momentarily hold the coin or token positioned in the channel 37 for engagement by the rod 56. When an attempt is made to operate the device without first inserting a proper coin or token in the chute 33, the downward movement transmitted to the rocker arm A by the cam 46 is arrested when the lug 52 enters the notch 51 of the latch 48. The cooperation of the lug 52 with the latch notch 51 of course prevents actuation of the operating drive 14 by the means 11.

The coin control of the operating means 11 includes means for automatically advancing or feeding coins or tokens through the channel 37. A lever 58 is pivoted on the fixture 36 and has a finger on its outer end adapted to operate downwardly through the slot 38 communicating with the coin channel 37. A link 60 is pivotally connected with the lever 58 and extends downwardly to the arm A of the rocker 44. A pin 61 on the rocker arm A operates longitudinally in a slot 62 in the link. A spring 63 extends between a pivoted clip 69 on the pin 61 and a post on the link 60 and forms a yielding operating connection between the rocker arm A and the link 60. The spring 63 is adapted to transmit force from the arm A to the link 60 to cause downward pivoting of the lever 58 during the initial portion of the movement of the rocker 44 so that the coins or tokens in the channel 37 are fed downwardly and the spring 63 is adapted to yield upon the lever 58 engaging the lower end of the slot 38 in the back wall of the fixture 36, to allow the movement of the rocker arm A to continue. The coin and token advancing means just described is timed so that the coins and tokens are not fed downwardly until the rod 56 has contacted the uppermost coin or token and through such contact has caused the latch 48 to be held inactive to permit the lug 52 to pass the notch 51.

The operating means 11 is such that the mechanism cannot be improperly operated by incomplete actuation of the handle 43 or premature returning of the handle 43. Ratchet means is provided in connection with the rocker 44 and includes a set or series of ratchet teeth 64 on the outer end of the rocker arm B. A pawl 65 is pivoted on the chassis plate 30 in a position to cooperate with the ratchet teeth 64. A spring 66 controls the operation of the pawl 65. The active or pointed end of the pawl 65 is designed to readily ride over the teeth 64 during the turning of the rocker 44 by the cam 46 and is adapted to cooperate with the teeth 64 to prevent any return movement of the rocker 44 before the rocker has moved through its entire initial or primary stroke. A spring 67 is provided to return the rocker 44 and the operating lever or handle 43 to their original positions after the handle has been pulled downwardly and forwardly to its lowermost position. The spring 67 has one end connected with a post 68 on the plate 30 and one end connected with a clip 69 on the pin 61. The spring 67 is elongated or put under increased tension when the rocker 44 is turned and contracts to return the rocker operating lever 43.

The dice carrying wheels or dice wheels 12 and 13 are provided to visibly indicate to the player the point or number combination made at each play or operation of the machine. The wheels 12 and 13 are substantially identical and are arranged in adjacent end to end relation. A shaft 76 extends between and is supported on the plate 30 and a bracket 77 on the plate 31. A sleeve 78 is rotatable on the shaft 76 and carries the wheels 12 and 13. The wheel 12 is fixed on the sleeve 78 to rotate therewith while the wheel 13 may rotate on the sleeve at certain stages of operation of the device. The hub 79 of the wheel 12 has a split extension 80 which is clamped on the sleeve 78 by screws 81. The adjacent wheels 12 and 13 are positioned so that limited areas or portions of their peripheries are visible through the sight opening 21. Means is provided whereby the wheel 13 is driven or turned by the wheel 12 and yet may rotate independently of the wheel 12 when the wheels have different speeds of rotation and when the wheel 12 is at rest. A bracket 82 is provided on the hub extension 80 of the wheel 12 and carries a pivoted pawl 83. The pawl 83 is adapted to cooperate with an axially projecting lug 84 on the hub of the wheel 13 to cause the wheel 13 to turn with the wheel 12 when the sleeve 78 is rotated by the operating drive 14, as will be subsequently described and is adapted to ride or ratchet over the lug 84 when the wheels subsequently have different speeds of rotation. A spring 85 normally yieldingly holds the pawl 83 in position to have wheel-turning engagement with the lug 84. It will be apparent how the pawl 83 may ratchet over the lug 84 when the wheels 12 and 13 have different speeds of rotation and when the wheel 13 continues to rotate after the wheel 12 has been stopped by the means 15.

The peripheries of the wheels 12 and 13 are provided with indicia which in the case illustrated is in the form of sets or groups of pips or markings of the character commonly found on dice, it being understood that the wheels may be marked in various manners and for various purposes. The pips or marks on the wheels 12 and 13 occur in the groups or sets of one to six present on the typical dice. Raised parts or members 87 simulating dice faces occur on the peripheries of the wheels. As illustrated in Fig. 3 of the drawings the parts or members 87 are provided with the marks or pips 88 found on dice and have the same general appearance as the sides or faces of dice. The members 87 are equally spaced around the peripheries of the wheels and an equal number of members 87 is provided on the two wheels. The machine may be designed to have any required or desired number of dice members 87 on its wheels 12 and 13. In the particular construction being described there are twenty dice members 87 on each wheel 12 and 13. It is preferred to have several of each of the various sets or combinations of pips or markings on each wheel 12 and 13. In accordance with the invention the wheels 12 and 13 are always in the same rotative positions with respect to one another when stopped or at rest. When the wheels 12 and 13 are at rest, their members 87 are in axially aligned pairs. Further, the delayed means 15 for stopping the wheels is such that the wheels are always stopped in any one of a plurality of different rotative positions where two axially aligned members 87 of the two wheels are in registration with the sight opening 21 to be visible to the player. It is to be understood that the pips or markings 88 of the two wheels 12 and 13 may be related and paired to provide the wheels with various numbers of the various possible combinations and points. The respective numbers of the crap combinations or losing combinations: 2, 3 and 12; the winning combination 11, the combination 7, and the point combinations or points, 4, 5, 6, 8, 9 and 10 present on the wheels 12 and 13 when the wheels are at rest, of course, determines the ratio between the player's chances of losing and winning by receiving coins or tokens from the pay-off means 16.

The operating drive 14 between the coin controlled operating means 11 and the dice wheels 12 and 13 provides for the rotation of the wheels when the operating handle or lever 43 has been fully actuated downwardly and forwardly by the player. The drive 14 includes a transverse or horizontal shaft 89 extending between the chassis plates 30 and 31 and rotatably carried by suitable bearings on the plates. An arm 90 is provided on the shaft 89 and is adapted to be engaged by a pivoted trip or pawl 91 on the rocker arm C during the primary stroke of the rocker arm 44. The engagement of the pawl 91 with the arm 90 causes turning of the shaft 89. When the rocker 44 is returned by the spring 67 the pawl 91 ratchets or rides over the end of the arm 90 without causing movement of the shaft 89. A forwardly projecting lever arm 92 is provided on the shaft 89 to operate or turn a yoke 93. The yoke 93 is adapted to rotate or turn on the sleeve 78. A slack link connection is provided between the arm 92 and the yoke 93. A link 94 is pivotally connected with the end of the arm 92 and extends upwardly to the yoke 93. A pin 95 projects from the yoke 93 and cooperates with a longitudinal slot 96 in the upper end portion of the link. The yoke 93 straddles a star wheel 97 on the sleeve 78 and carries a spring urged pawl 98 for cooperating with the teeth 99 of the star wheel. The star wheel 97 is fixed to the sleeve 78 to rotate therewith.

When the shaft 89 is turned through the action of the pawl 91 engaging the arm 90 the link 94 is moved upwardly without causing turning of the yoke 93 until the lower end of the slot 96 engages the pin 95 to cause the yoke to be turned. Further turning of the shaft 89 results in swinging or pivoting of the yoke 93 so that its pawl 98 rides or ratchets over the star wheel teeth 99. Means is provided for preventing turning of the star wheel 97 when the pawl 98 ratchets over the star wheel teeth as just described. A stop lever 100 is pivotally supported on the transverse chassis plate 32 and is swung into holding cooperation with one of the star wheel teeth 99 by a projection 101 on the arm 92. A spring 102 acts on the stop lever 100 to normally hold it in a position clear of the star wheel teeth and to automatically retract it from the star wheel upon the return of the arm 92. An actuating spring 103 is connected to the yoke 93 to suddenly and forcibly return the yoke, and thus cause rotation of the star wheel 97, when the pawl 91 releases the arm 90 at the end of the primary stroke of the rocker 44. The spring 103 is sufficiently strong to rotate the star wheel 97 rapidly and the pawl 98 is adapted to effectively cooperate with the teeth 99 of the star wheel during the return or actuating movement of the yoke. As the dice wheel 12 is fixed on the sleeve 78 it rotates together with the star wheel 97 upon the star wheel being rotated by the yoke 93 in the manner just described. A stop 104 is provided on the fixture 36 to limit the wheel turning movement of the yoke 93. The stop 104 has a piece 105 of silencing and shock absorbing material which is engaged by the outer or transverse part 93a of the yoke. An extension 106a is provided on the stop 104 and is engaged by the pawl 98 when the yoke comes into engagement with the stop. The cooperation of the pawl 98 with the stop extension 106a pivots the pawl out of cooperation with the star wheel teeth 99 and maintains the pawl free of the teeth while the yoke is in engagement with the stop 104 so that the star wheel 97 is free to rotate. The pawl 83 carried by the hub of the wheel 12 cooperates with the lug 84 on the hub of the wheel 13 to cause the wheel 13 to be rotated by the wheel 12 when the star wheel 97 and the wheel 12 are rotated by the spring actuated yoke 93. From the above it will be seen how the actuating drive 14 causes rotation of the dice wheels 12 and 13 when the rocker 44 is actuated by the operating handle or lever 43. It is to be noted that the wheels 12 and 13 are not rotated until the operating handle or lever 43 has been turned to its full down and forward position to provide for the release of the pawl 91 from the shaft arm 90.

The means 14 for stopping rotation of the dice wheels 12 and 13 is a delayed means, that is, it does not act to stop the wheels until some time after the complete actuation of the operating handle or lever 43. The means 15 operates to first stop the dice wheel 12 and then allows rotation of the dice wheel 13 for a short period before stopping it. In accordance with the invention the means 15 operates to always stop the dice wheels 12 and 13 in the same rotative positions with respect to one another but by allowing continued rotation of the wheel 13 after the stopping of the wheel 12 makes it appear to the player that the wheels 12 and 13 stop in various different relative rotative positions. This stopping of the dice wheels 12 and 13 in the same relative rotative positions with respect to one another upon each operation or play of the machine provides for the definite and known axial alignment or pairing of the dice members 87 of the wheels. From this it is obvious that the same combinations or pairs of sets of points or markings are always present on the two wheels when they are at rest. The wheel stopping means 15 includes a pivoted stop or finger 106 on the transverse chassis plate 32. The finger 106 projects upwardly and has a lateral nose 107 adjacent its upper end for cooperating with the teeth 99 of the star wheel 97. A guide bracket 108 is provided on the chassis plate 32 and has slots for guiding the upper and lower arms of the pivoted finger 106. A spring 109 is connected with the lower arm of the finger 106 to normally urge the nose of the finger into engagement with the star wheel. The finger 106 is adapted to engage the star wheel 97 to stop rotation of the star wheel and the dice wheel 12 and is controlled by a latch as will be subsequently described.

The means 15 for stopping the dice wheels 12 and 13 includes a releasable clutch for clutching the wheel 13 to the wheel 12 after the rotation of the wheel 12 has stopped. The clutch includes a disk 110 slidable on the sleeve 78 and movable toward and away from the hub of the wheel 12. A pin 111 is provided on the disk 110 and is slidable through a longitudinally extending opening 112 in the hub 79 of the wheel 12. A spring 113 is arranged between the clutch disk 110 and the hub of the wheel 12 to normally urge the disk outwardly away from the hub. A screw 114 limits this outward movement of the disk. The pin 111 is adapted to project from the inner side of the hub 79 to cooperate with the lug 84 when the disk 110 is shifted toward the hub 79. A pivoted cam 115 is provided for moving the clutch disk 110 toward the hub 79 to cause the pin 111 to be moved to a position for engaging the lug 84. In the particular construction illustrated in the drawings the cam 115 is pivotally supported by a bracket 116 carried by the chassis plate 31. The cam 115 is in the nature of a lever whose upper arm is curved to have a camming engagement with the disk 110 to move the disk toward the hub 79 of the wheel 12. A link 117 is pivotally connected with the lower arm of the cam 115 and extends to a point adjacent the lower end of the guide bracket 108. A lever 118 is pivotally mounted on the transverse chassis plate 32 adjacent and in parallelism with the stop finger 106. The outer end of the link 117 is pivotally connected with the lower arm of the lever 118. In practice a single pin 119 may pivotally support both the finger 106 and the lever 118.

A latch 120 is provided for controlling the stop finger 106 and the lever 118. The latch 120 is pivotally mounted at the upper end of the plate 32 and is positioned to cooperate with the upper ends of the finger 106 and the lever 118. A spring 121 normally yieldingly urges the latch 120 downwardly to the position where it is in latched or holding engagement with the finger 106 and the lever 118. A spring 122 is connected with the lower arm of the lever 118 to normally tend to pivot the lever in a direction to cause the cam 115 to actuate the clutch disk 110. The finger 106 for stopping the star wheel 97 and the lever 118 for controlling actuation of the clutch are normally urged in the same direction by their respective springs and are adapted to be held against this movement by the latch 120. The latch 120 is arranged to be disengaged from the finger 106 and the lever 118 by being pivoted upwardly out of engagement with the upper ends of the finger and lever. The upper arm of the finger 106 is shorter than the upper arm of the lever 118 to be released by the latch 120 before the lever 118 so that it may move into stopping cooperation with the star wheel 97 before the lever 118 is actuated by the spring 122 to operate the clutch for stopping the dice wheel 13.

The means 15 for stopping rotation of the dice wheels 12 and 13 includes a cam part 123 on the latch 120 and a substantially vertical lever 124 carrying a roller 125 for cooperating with the cam part. The lever 124 is pivotally carried by a suitable bracket at a point adjacent the guide bracket 108. The lower arm of the lever 124 projects downwardly beyond the shaft 89 and is guided by a slotted guide 126. The roller 125 is provided on the upper end of the lever 124 and is adapted to cooperate with the cam part 123 to disengage the latch 120 from the stop finger 106 and the lever 118 when the lever 124 is pivoted or actuated.

The latch releasing lever 124 is operated or governed by a spring driven clock works or gear mechanism 128 which controls the lever 124 to delay the release of the latch 120 until the dice wheels 12 and 13 have rotated for a suitable period after actuation of the operating handle or lever 43. The mechanism 128 comprises a speed reducing train 129 of gears supported in a suitable housing or frame 130. A movement resisting fan or bladed wheel 131 is driven or rotated at one end of the gear train 129 while a shaft 132 at the other end of the train carries a cam 133. A comparatively heavy spring 137 is connected with the cam 133 and operates to turn the cam against the action of the speed retarding gearing. An arm 138 projects from the main shaft 89 and a link 139 operatively connects the arm 138 with the cam 133. The link 139 has a slack pin and slot connection 140 with the arm 138 to permit return movement of the link without causing rotation of the shaft 89.

The gear mechanism includes a pinion 134 fixed on the shaft 132 and a larger gear 135 free or rotatable on the shaft 132. One or more ratchet pawls 136 are provided on the gear 135 and freely ride over the teeth of the pinion during the primary or initial stroke of the link 139 and cam 133 and have driving or turning cooperation with the pinion on the reverse stroke so that the speed reducing gear train 129 comes into operation to resist movement of the cam and link and reduce the speed of the force exerted on the cam and link by the spring 137. A cam 142 is provided on the link 139 to engage the lower arm of the latch releasing lever 124. When the link 139 is returned by the spring 137 under the control or speed reducing action of the gear mechanism 129 the cam 142 acts to pivot the lever 124 so that its roller 125 cooperates with the cam part 123 to pivot the latch 120 and release it. This release of the latch 120 is slow due to the movement retarding action of the gear mechanism 129. During the slow releasing movement of the latch 120 the latch moves out of holding engagement with the shorter stop finger 106 so that the finger is pivoted by the spring 109 to have its nose 107 come into cooperation with the teeth of the star wheel 97. This, of course, stops rotation of the star wheel and the dice wheel 12. The slow releasing movement of the latch 120 continues after the release of the finger 106 during which time the dice wheel 13 is permitted to continue to rotate.

The slowly moving latch 120 finally disengages from the upper end of the lever 118 to permit the lever to be pivoted by the spring 122 so that the cam 115 actuates the clutch disk 110. This actuation of the clutch disk causes the pin 111 to be projected to a position where it strikes the lug 84 to stop rotation of the dice wheel 13. The pawl 83 prevents rotation of the dice wheel 13 in a reverse direction when the pin 111 is engaged by the lug 84. From the above it will be seen that the slow release of the latch 120 first results in stopping of the dice wheel 12 followed by stopping of the dice wheel 13.

The token and coin dispensing means or pay-off means 16 is controlled or actuated by the control 17 and is adapted to discharge coins or tokens into the chute 24. The pay-off means 16 may be conditioned to exclusively pay off perforated tokens or to pay off coins with which the machine is actuated. The optional means for setting or conditioning the pay-off means 16 for the exclusive handling of perforated tokens or coins will be subsequently described. The pay-off means includes a receptacle or container 143 for the tokens or coins to be dispensed or paid off to the player when the machine operates to cause the combination of 7 or 11 to come into register with the sight opening 21 or causes a point 4, 5, 6, 8, 9 or 10 to be made the second time in a series of plays. The container 143 is in the form of a tube that is positioned so that its upper end is directly below the lower end of the coin and token channel 37 to receive coins and tokens that pass downwardly from the channel. In practice the tubular container 143 is sufficiently long to store or hold a comparatively large number of coins and/or tokens. Longitudinal slots 145 are provided in the container 143 so that the number of coins or tokens in the container may be determined. The mounting 146 for the lower end of the tubular container 143 is supported on spaced upwardly projecting lugs 147 of a plate 151. A vertical opening 149 in the mounting 146 communicates with the lower end of the container 143. A coin and token discharge opening 150 is provided in the base 27 and the plate 151. The opening 150 is spaced from the opening 149 and is located so as to discharge downwardly into the pay-off chute 24.

A gate 148 is provided to control the discharge of coins and tokens from the container 143. The gate 148 is a plate like member slidably arranged between the lower end of the mounting 146 and the plate 151. The gate 148 is guided by the spaced lugs 147 of the plate. The gate 148 is adapted to carry a predetermined or definite number of coins or tokens from the opening 149 to the discharge opening 150. A coin and token holding opening 152 is provided in the gate 148 and the gate is movable from a position where its opening 152 is in direct vertical register with the opening 149 and a position where its opening 152 is in vertical registration with the opening 150. The opening 152 of the gate is proportioned to hold two coins or tokens of the character employed in playing the machine. A spring 153 is connected to the gate 148 to operate it from the position illustrated in Fig. 6 of the drawings to the position where its opening 152 registers with the opening 150 to discharge two coins or tokens into the chute 24. The chute 24 carries the coins or tokens to the opening 23 in the front of the case 10 where they are accessible to the player. The pay-off gate 148 is normally releasably held by the control 17 in the position where its opening 152 is at the opening 149. The control 17 releases the gate for actuation by the spring 153 when the combinations or numbers 7 or 11 come into registration with the sight opening 21 with the stopping of the dice wheels 12 and 13 at the first play of the machine and when a point or combination number comes into registration with the sight opening for the second time when the wheels are stopped in a single series of play.

The coin and token dispensing or pay-off means 16 may include means for separating coins and imperforate tokens from perforated tokens. This selecting or separating means includes a rod 70 adapted to be operated forwardly through an opening in the fixture 36 to engage the central portion of a coin or imperforate token to eject it from the channel 37 and thus prevent it from entering the container 143. A pivoted spring held gate 71 normally closes a lateral opening or notch in the wall of the channel 37 adjacent the point where the rod 70 passes into the channel. The coin or imperforate token may be forced forwardly by the rod 70 to open the gate 71 so that it is ejected from the channel 37. The coin or imperforate token thus ejected from the channel 37 falls into a chute 72 which discharges into a receiver or removable receptacle 73. The rod 70 is spaced some distance below the coin engaging rod 56 and is projected into the channel 37 simultaneously with the retraction of the rod 56. The rod 70 is operated by a lever 74 pivoted on the chassis plate 30. The inner end of the ejecting rod 70 is pivotally connected with the upper end of the lever 74 by a pin 158. A yielding or spring held member 75 is provided on the rocker arm B to normally engage the lower arm of the lever 74. This engagement normally holds the rod 70 in a position where it projects through the coin channel 37. The spring 49 is operatable to turn the lever 74 and retract the rod 70 from the channel 37 when the rocker 44 is turned by pulling the operating handle 43 downwardly and forwardly. During the primary or operating stroke of the rocker 44 the latch operating spring 49 retracts the ejecting rod 70 allowing the advancing lever 58 to feed or advance the coins and/or tokens downwardly through the channel 37. The rod 70 is positioned to intersect the channel 37 at a point equally spaced between the opposite vertical edges of the channel so that the rod may freely pass through the central perforations in the perforated tokens. Therefore, the rod 70 does not eject perforated tokens through the gate 71 into the chute 72 but allows them to fall into the pay-off container 143.

The dispensing means of pay-off means 16 preferably includes means for removing excess coins or tokens from the upper end of the container 143 when the container becomes completely filled. The means for removing excess coins from the upper end of the container 143 is associated with the mechanism just described for separating the coins and imperforate tokens. A lever 154 is pivoted at its lower end to the frame plate 30. A finger 155 is pivotally connected with the upper end of the lever 154 and is movable inwardly through an opening in the wall of a chute 156. The chute 156 extends from the upper end of the container 143 and discharges into the chute 72. The finger 155 is adapted to move into the chute 156 adjacent the upper end of the container 143. The lever 154 is operatively connected with the coin and token separating means. A lever 157 is pivotally mounted on the plate 30 and a slot is provided in its upper end for passing a pin 158 on the upper arm of lever 74. The pin 158 forms the operative connection between the lever 74 and the coin ejecting rod 70 of the separating means. The pin and slot connection between the lever 74 and the lever 157 is such that the lever 157 is caused to pivot upon actuation of the rod 70. A lug 159 is provided on the lever 154 and has an operative connection 160 with the lever 157 whereby the finger is operated into the chute 156 simultaneously with the rod 70. The rod 70 and the finger 155 are both retracted as the coin advancing lever 58 feeds the coins or tokens downwardly through the channel 37 and are simultaneously moved into operation upon the upward retraction of the lever 58. When the container 43 becomes completely filled and the uppermost coin or token of the stack held by the container projects into the chute 156 the finger 155 is adapted to displace this coin or token into the chute 156 so that it falls through chute 72 to be received in the receptacle 73.

The control 17 is an important feature of the invention as it governs the action of the operating means 11 and controls the operation of the pay-off means 16. The control 17 is entirely automatic and its operation is determined by the rotative position assumed by the star wheel 97 when stopped by the means 15 and its operation is, therefore, definitely related to the rotative positions of the stopped dice wheels 12 and 13. In the application of the invention being described the control 17 releases the pay-off gate 148 to carry coins or tokens to the discharge opening 150 when the dice wheels 12 and 13 are stopped in positions where the total of the marks or pips of the aligned pair of dice members 87 at the sight opening 21 amounts to 7 or 11 at the first play of the machine, and causes the latch 48 to be held released upon a number combination or point of 4, 5, 6, 8, 9 or 10 appearing at the sight opening when the wheels 12 and 13 are stopped at the first play of the machine in which case the control 17 holds the latch 48 released during subsequent operations or plays until the number combination or point is repeated when it releases the pay-off gate 148 to pay off coins or tokens to the player whereupon the latch 48 is conditioned to prevent further play until the operating means 11 is again rendered operative by the insertion of a proper coin or token in the coin receiving chute 33. In the event that the combination or number 7 is indicated by the dice members 87 at the sight opening 21 before the point made at the first play or operation is repeated, the control 17 automatically conditions the latch 48 to make the operating means 11 inoperative until a proper coin or token is inserted in the chute 33 and does not release the gate 148 for the paying off of coins or tokens when the number 7 appears at this time. The control 17 does not release the gate 148 for the paying off of coins or tokens and does not release the latch 48 for further play of the machine when the crap numbers 2, 3, or 12 are brought into register with the sight opening 21 upon the stopping of the dice wheels 12 and 13 at the first play following the insertion of the required coin or token in the chute 33.

The control 17 includes a plurality of pivoted levers or triggers 161. The triggers 161 are normally substantially vertical and are arranged in spaced parallel relation. The triggers 161 are pivotally supported at their lower ends on a pin 162. A bracket 163 is mounted on the plate 30 to carry the pivot pin 162. A lateral or substantially horizontal flange 164 projects from the bracket 163 and has a plurality of slots which guide and space the triggers 161. A laterally projecting finger 165 is provided on the upper end of each trigger 161 and projects toward the star wheel 97. The fingers 165 of the several triggers are of the same length and are curved to be substantially concentric with the pivotal axes of the triggers. A bracket is attached to the plate 30 and has a horizontal flange 166 and a vertical flange 167 at the outer end of the flange 166. Slots 168 are provided in the flange 166 to space and guide the bodies of the triggers 161 while similar slots 169 are provided in the upstanding flange 167 to guide the fingers 165. Springs 170 are connected to ears 171 on the triggers 161 and the flange 167 to normally urge or pivot the triggers toward the star wheel 97. The active or outer ends of the fingers 165 lie in a horizontal plane spaced slightly above the plane of the axis of rotation of the star wheel 97.

The control 17 includes a multiplicity of openings 172 in the star wheel 97 for receiving the outer end portions of the trigger fingers 165. There may be one or more openings 172 provided in the star wheel for receiving each of the fingers 165. The openings 172 are positioned radially with respect to the axis of the star wheel to properly receive the intended fingers 165 and are spaced circumferentially around the star wheel to bear definite relationships to the combinations or points of the dice pips on the wheels 12 and 13. One trigger finger 165 is provided for each of the game points 4, 5, 6, 8, 9 and 10 and the openings 172 are positioned to receive the fingers when the game points to which they are related in function are in register with the sight opening 21. For example, when the dice wheels 12 and 13 are stopped in a position where the game number or point 4 is at the sight opening 21, an opening 172 in the radial position to receive the finger 165 operatively related to the game point 4 is in a rotative position to receive the said finger. This relationship exists between the several openings 172 and fingers 165, the openings 172 being located to properly receive the intended fingers when the star wheel 97 is stopped by the cooperation of the stop finger 107 with a star wheel tooth 99. As an opening 172 is provided for each game point 4, 5, 6, 8, 9 and 10 present on the dice wheels 12 and 13 as stopped by the means 15 and a finger 165 is provided for entering any one of the openings 172 of each of these game points, a finger 165 enters an opening 172 each time the wheels 12 and 13 are stopped with any one of the game points at the sight opening 21.

A trigger 173 is provided for the combination or game number 7 as indicated by the pips of the members 87 of the dice wheels. The seven trigger 173 has a finger 165ª on its upper end projecting toward the star wheel 97. The finger 165ª is similar to the fingers 165 and is adapted to cooperate with or enter one or more openings 172ª in the star wheel. One opening 172ª is provided in the star wheel 97 for each game number seven (7) present on the wheels 12 and 13 as indicated by the dice pips of the members 87 when the wheels are in their stopped positions. In the particular case illustrated in the drawings there are four openings 172ª each capable of receiving the finger 165ª. A trigger 174 is provided for the combination or game number 11 and has a finger 165ᵇ projecting toward the star wheel 97. An opening 172ᵇ is provided in the star wheel 97 to receive the active outer end portion of the finger 165ᵇ. An opening 172ᵇ is provided in the star wheel for each game number 11 present on the dice wheels 12 and 13 as stopped by the means 15. In the form of the invention illustrated in the drawings there is only one opening 172ᵇ which is circumferentially positioned to receive the finger 165ᵇ when the dice wheels 12 and 13 are stopped in the position where the pair of aligned dice members 87 at the sight opening 21 carries marks or pips totalling 11. The triggers 173 and 174 are preferably arranged at one end of the series of triggers 161 and may be pivotally supported on the pivot pin 162.

Means is provided for holding the trigger fingers 161, 165ª and 165ᵇ out of engagement with the star wheel 97 until the dice wheels 12 and 13 have been stopped by the means 15 in the manner previously described. A rocker 175 is pivotally carried by the bracket 163 and has an arm or flange 176 for engaging the forward edges of the series of triggers 161, 173 and 174. The rocker 175 is under the control of the latch releasing lever 124 and is released by the action of the gear mechanism 128. An arm 177 projects from the rocker 175 and has its outer end guided by a bracket or guide 178. A catch projection 179 is provided on the outer portion of the arm 177 and a latch projection 180 is provided on the lever 124 to engage under the projection 179 and releasably hold the rocker 175 in a position where the triggers 161, 173 and 174 are engaged by the stop flange 176 and maintained inoperative. The cooperating projections 179 and 180 are related to provide for the release of the rocker 175 subsequent to the release of the latch 120 so that the triggers are not released for movement until after the dice wheels 12 and 13 have been stopped by the means 15.

In accordance with the invention movement of any one of the triggers 161 resulting from the passage of a finger 165 into an opening 172 causes the latch 48 to be held released to permit successive plays or operations of the machine without the necessity of inserting a token or coin in the chute 33 until the point number or point is repeated or until the combination or number 7 appears at the sight opening 21 when the wheels 12 and 13 are stopped during such a successive play. A slide 182 is arranged at the outer side of the plate 30. The upper end portion of the slide 182 has shiftable engagement with the bracket 163 and has spaced pin and slot connections 183 with the bracket. A bar 184 is attached to the lower portion of the slide 182 and has grooves 185 in its opposite ends receiving the portions of the plate 30 at the opposite ends of an opening 186 in the plate. A spring 187 is connected with the slide 182 to normally urge the slide upwardly. A latch lever 188 is pivotally mounted on the plate 30 and carries an arm 189 for engaging the forward edges of the several triggers 161. A downwardly facing shoulder 190 on the latch lever 188 engages the upper side of the bar 184 to normally releasably hold the slide 182 in a down position. A spring 191 is connected with the latch lever 188 to urge it to a position where the arm 189 engages the triggers 161 and the shoulder 190 cooperates with the bar 184.

A sliding bolt 192 is carried for longitudinal movement by the bar 184 and is adapted to project from an end of the bar. A lever 193 is pivoted on the inner side of plate 30 in a position to have one of its arms engaged by the sliding bolt 192. The lever 193 is pivotally connected with a lever 194 which is arranged on the inner side of plate 30. The lever 194 projects to an edge of the plate 30 and is adapted to be engaged by the pin 54. This engagement of the pin 54 with the lever 194 renders the latch 48 inoperative so that the rocker 44 may pivot and have its lug 52 pass the notch 51 of the latch. Suitable control springs 195 are connected with the levers 193 and 194. When the wheels 12 and 13 stop in a rotative position where one of the point combinations or numbers 4, 5, 6, 8, 9 or 10 is at the sight opening 21 a finger 165 passes into an opening 172 to permit a trigger 161 to pivot. This pivoting of the trigger 161 swings the latch lever 188 to release its shoulder 190 from the bar 184 so that the slide 182 is permitted to move upwardly under the action of the spring 187. The upward movement of the slide 182 brings the projecting end of the bolt 192 into contact with the lever 193 to pivot the lever 194 to a position where it is engageable by the pin 54 which renders the latch 48 inoperative, as described above.

The means just described for rendering the latch 48 inoperative when a point combination or number such as 4, 5, 6, 8, 9 or 10 is made at the first play is operatively related to the delayed means 15 for stopping the wheels 12 and 13 in a manner so that the latch controlling lever 194 is moved downwardly to cooperate with the pin 54 substantially simultaneously with the release of the latch 120 and the resultant stopping of the wheels 12 and 13 during each play or operation of the machine subsequent to the making of the point combination or number so that the operating lever or handle 43 cannot be repeatedly oscillated at a single play to rotate the wheels 12 and 13 without allowing stopping of the wheels by the means 15. The operative connection between the lever 194 and the means 15 includes a bell crank 198 which is operated by a spring 199. A link 200 is provided to connect the bell crank 198 with an upstanding arm 201 on the link 139 of the means 15. A pin and slot connection 202 is provided between the arm 201 and the link 200 so that the bell crank 198 is not turned during the primary movement of the link caused by the turning of the shaft arm 138 or by the initial return movement of the link 139 by the spring 137. When the link 139 approaches the end of its return stroke by the spring 137 and after the release of the latch 120 and stopping of the wheels 12 and 13 the arm 201 of the link 200 transmits a turning force from the link 139 to the bell crank 198 so that the bell crank returns the lever 194 to a position where it is engageable by the pin 54 to again render the latch 48 inoperative.

The triggers 161, 173 and 174 control the pay-off means or coin dispensing means 16 and an operative connection is provided between the triggers and the means 16. A frame 205 is arranged for engagement and movement by the triggers and the slide 182. The frame 205 may be in the form of a plate having a comparatively large rectangular opening 206. In accordance with the invention, the frame 205 is supported for vertical and pivotal movement. A bracket or support 207 is provided on the plate 30 and extends above the series of triggers. A hinge 208 is pivotally attached to the support 207 by a pin 209 extending between spaced lugs on the support. The hinge 208 projects horizontally outwardly beyond the support 207 and carries a horizontal pivot pin 210. Spaced ears 211 project from the upper end of the frame 205 and have openings passing the pivot pin 210. The pivotal mounting of the hinge 208 and the pivot connection between the hinge and frame 205 allow the frame to shift vertically and to pivot about the pin 210. Rollers 212 may be provided to guide the frame 205 for vertical movement and to limit swinging of the frame in one direction. Means is provided whereby upward movement of the slide 182 may be transmitted to the frame 205. A downwardly projecting extension 213 is provided on the frame 205 to cooperate with the inwardly extending finger 214 of a member 215 connected with the slide 182. The member 215 has sliding pin and slot connections 216 with the slide 182 whereby it may shift vertically with respect to the slide. A spring 217 is connected with the member 215 to normally yieldingly hold it in an up position for cooperating with the frame extension 213.

The triggers 173 and 174 which are released for operation upon the numbers 7 and 11 registering with the sight opening 21 are each provided with a projecting hook 218 that is adapted to cooperate with the lower bar or portion of the frame 205 to pivot the frame. As the arm 189 does not cooperate with the triggers 173 and 174 the movement of either of these triggers does not result in upward shifting of the slide 182 and frame 205. A releasable latch connection is provided between the frame 205 and the pay-off gate 148 whereby pivoting of the frame 205 by the 7 or 11 triggers 173 or 174 upon the first play or by the second operation of any one of the triggers 161 in a series of subsequent plays releases the gate 148 to pay off coins or tokens to the player. A latch 220 is pivoted on the base 27 and has an end adapted to engage the gate 148 to releasably hold it in the position where its opening 152 is in register with the opening 149. A lever 221 is pivotally attached to the plate 30 in a position to be operated by the frame 205 when the frame is pivoted inwardly through the operation of one of the triggers. A link 222 operatively connects the lever 221 with the latch lever 220 so that the pivoting of the lever 221 by the frame 205 results in disengagement of the latch lever 220 from the gate 148 to permit the spring 153 to pivot the gate to a position where it discharges the two coins or tokens from its opening 152 into the discharge opening 150. When the dice wheels 12 and 13 are stopped at the first play or operation in a position where the number 7 or the number 11 is at the sight opening 21, the trigger 173 or the trigger 174 is released for movement by its respective spring so that its hook 218 pivots the frame 205 and through the medium of the levers 220, 221 and the link 222 releases the latch 148 to pay off the coins or tokens. In the event that a point number 4, 5, 6, 8, 9 or 10 comes into register with the sight opening 21 during the first play, the slide 182 is released for upward movement by the latch 188 causing corresponding upward shifting of the frame 205 to bring it to a position where it cannot be engaged by the hook 218 during succeeding plays or operations of the machine. This upward shifting of the frame 205 conditions it for operation by the trigger 173 or by the trigger 161 of the point made at the first play. The spring for operating the slide 182 and the frame 205 upwardly and the latch 188 for releasing these members for upward movement when a point number is made at the first play have been previously described. Each trigger 161 is provided with a hook 224 adapted to cooperate with the lower portion of the frame 205 when the frame is in its upper position, as just described. The hooks 224 project through the opening 206 in the frame and the hook of the trigger 161 that may operate when a combination point is made at the first play or operation of the machine is adapted to clear the frame without pivoting it at this first play. The hook 224 of the trigger 161 that is actuated when a combination point is made at the first play momentarily depresses the frame 205 when it is returned to its initial position. The spring held member 215 moves downwardly during this depression of the frame 205 without resulting in a downward shifting of the slide 182.

The control 17 includes means for returning all of the triggers 161, 173 and 174 to positions out of engagement with the star wheel 97 during the initial portion of each operation or play. As described above, the rocker 175 is released immediately subsequent to the release of latch 120 to permit the fingers of the triggers to come into contact with the star wheel. The rocker 175 is automatically returned to its trigger holding position and is releasably latched in this position during the first part of every play. An arm 225 is provided on the shaft 89 to cooperate with a projecting part or cam 226 on the rocker 175 to cause the rocker to be returned to the position where it holds the trigger fingers 165, 165ª and 165ᵇ out of engagement with the star wheel and so that the rocker is releasably latched against movement through the cooperation of the parts 179 and 180. The stop finger 106 and the clutch controlling lever 118 are automatically reset or relatched substantially simultaneously with the return of the triggers. An arm 241 is provided on the shaft 89 to operate a lever 242 to return the finger 106 and the lever 118 to the latch 120. A link 243 connects the arm 241 with the lever 242. When the finger 106 and the lever 118 are returned by the lever 242 the latch 120 is reconditioned to hold them by movement of the lever 124. Relatching of the stop finger 106 and the lever 118 and the holding of the triggers out of engagement with the star wheel frees the star wheel 97 and the dice wheels 12 and 13 for rotation by the drive 14.

The invention includes means for latching the triggers 161 that are not operated when a point number is made at the first play or operation of the machine to render them inoperative during subsequent plays so that only the trigger 161 of the combination or point made at the first play and the trigger 173 of the number 7 are operative during such subsequent plays. A plurality of latches 227 is provided on the lower bar 184 of the slide 182. The latches 227 are adapted to cooperate with hooks or catches 228 on the triggers 161. The latches 227 are urged into operative positions by springs 229. As the slide 182 is not released for upward movement until the finger 165 of a trigger 161 has entered an opening 172 at the first play or operation the latch 227 for this trigger cannot engage its catch 228. When the slide 182 moves upwardly the latches 227 cooperate with the catches 228 of the other triggers 161 and the cooperation of the latches with the catches is such that the fingers 165 of these triggers 161 are prevented from entering the openings 172 so that the latched triggers cannot pivot the frame 205 during subsequent plays. In this manner the trigger 161 of the number or point appearing at the first play remains free for further full operation during subsequent plays while the other triggers 161 are rendered inoperative by the latches 227 during these subsequent plays and until the number 7 or the original point is repeated. Upon the return of the triggers 161 by the rocker 175 the catch 228 of the trigger 161 whose finger 165 has entered the opening 172 at the first play merely pivots the latch 227 without being caught or held by the latch.

The hook 224 of this free trigger 161 contacts the lower bar of the frame 205 to cause momentary downward shifting of the frame when the trigger is returned and assumes a position where it is adapted to engage the lower bar of the frame to pivot the frame when the trigger is again actuated in the event that the point is repeated. The hook 224 of the free trigger 161 thus operates to pivot the frame 205 when the point is repeated and pivoting of the frame 205 releases the pay-off gate 148 to move to a position where it pays off the coins or tokens through the discharge opening 150. From the above it will be seen that the control 17 automatically releases the pay-off gate 148 when an original point such as 4, 5, 6, 8, 9 or 10 is repeated in a series of plays and positively prevents a pay-off when the number 11 or any other point is made during such play.

The control 17 includes means whereby the latch 48 is released to control the operating means 11 upon the number 7 being made in a series of plays following the making of any one of the point numbers or points 4, 5, 6, 8, 9 or 10. The stopping of the dice wheels 12 and 13 at a rotative position where the combination or number 7 is at the sight opening 21 in any play following the making of a point 4, 5, 6, 8, 9 and 10, results in the reconditioning of the latch 48 so that it is operatable to prevent actuation of the machine until a suitable coin or token is inserted in the chute 33. The reconditioning of the latch 48 when the number 7 is made in a series of plays is not accompanied by a pay-off. The trigger 173 (whose finger enters an opening in the star wheel 48 when the number 7 registers with the sight opening 21 at the stopping of the dice wheels) is provided with a hook 230. A member 231 is pivotally supported by the pin 210 and has a depending arm 232 adapted to be engaged by the hook 230. The arm 232 is preferably positioned at one end of the opening 206 and its lower end which is adapted to be engaged by the hook 230 is in a lower corner of the opening. A stop 233 is provided on the frame 205 to engage the arm 232 to limit outward swinging of the member 231 and to cause the member 231 to be moved or swung inwardly together with the frame 205. Prior to upward movement of the frame 205, following the release of the slide 182, the active end of the arm 232 is positioned so that the hook 230 clears it or freely passes it in the event that the 7 trigger 173 is actuated at the first play. Upward movement of the frame 205 by the slide 182 brings the arm 232 into a position where it may be engaged by the hook 230 of the 7 trigger if the number 7 appears in a play following the designating of a point 4, 5, 6, 8, 9 or 10 at the first or original play. The member 231 mounted as described above is adapted to pivot independently of the frame 205 and such independent pivoting of the member 231 caused by movement of the trigger 173 as well as pivoting of the member 231 with the frame 205, results in reconditioning of the latch 48.

The means for reconditioning the latch 48 upon independent pivoting of the member 231 includes a lever 234 mounted on the end of a support 207. A finger 235 on the lever 234 projects through an opening in the support to be engageable by a depending arm 236 of the member 231. A cam face 237 is provided on the lower arm of the lever 234 for cooperating with a cam face 238 on an end of the bolt 192. A spring 239 is provided to normally yieldingly hold the lever 234 in a position where it holds the bolt 192 where its end is in lifting cooperation with the lever 193. When the lever 234 is in its normal or active position it holds the bolt 192 in the position where its end projects to engage the lever 193, when the slide 182 is pivoted upwardly, as described above, whereupon it holds the lever in a position where the latch 48 is held against operation, this function of the lever 193 being under the control of the bell crank 198. When the member 231 is pivoted by the 7 trigger 173 or when it is pivoted together with the frame 205 upon the repetition of a point the lever 234 is pivoted to allow the bolt 192 to be shifted by a spring 240. This operation of the bolt 192 by the spring 240 retracts the projecting end of the bolt and allows the lever 193 to be returned by its spring so that the latch 48 is reconditioned to stop the rocker 44 until a suitable coin or token is inserted in the chute 33. From the above description of the control 17 it will be seen that the control governs the actuation of the latch 48 and pay-off means 16 so that the machine properly carries out all the various phases of the game (craps), bringing about the paying off of coins or tokens when 7 or 11 is made at the first play, permitting successive plays in the event that a point 4, 5, 6, 8, 9 or 10 appears at the first play, causing the paying off of coins or tokens if the same point number is repeated, and returning the machine to a normal condition without paying off in the event that 7 appears at such a succeeding play.

The invention includes means for resetting the slide 182, the frame 205 and the member 231 during the initial portion of the primary movement of the shaft 89 in the event that these elements have been actuated in the previous play or operation of the machine. An arm 250 is fixed on the shaft 89 and operates a link 251. A resetting lever 252 is pivotally carried by the pin supporting the lever 74 and has a pivotal connection 253 with the upper end of the link 251. A pivoted arm 254 on the lever 252 has a cam part 255 for cooperating with a cam face 256 on the lever 234. The slide 182 is provided with a laterally projecting lug 257 and the arm 254 is movable into engagement with the lug upon its cam part 255 cooperating with the cam face 256 on the lever 234. The initial movement of the shaft 89 during an operation of the machine following the release of the slide 182 causes the resetting lever 252 to be pivoted downwardly so that the cam part 255 cooperates with the cam face 256 to pivot the arm 254 over into engagement with the lug 257 on the slide. Further movement of the shaft 89 results in downward movement of the slide 182 and the slide is finally latched in its down position by the latch 188. The frame 205 follows the slide 182 downwardly and automatically assumes its down or normal position upon the slide being latched. The invention provides for the swinging or pivoting of the frame 205 and the member 231 to their normal substantially vertical positions when the slide 182 is relatched or reset. A spring held cam part 258 is provided on the lever 234 and is engaged by the resetting lever 252 during its downward movement to cause the lever 234 to be pivoted to a position to return the frame 205 and the member 231 to their substantially vertical positions.

Means is provided for resetting the coin dispensing means of pay-off means 16 during the play or operation following the release of the gate 148. A finger 260 projects from the cam 133 of the speed retarding mechanism 128 and is adapted to cooperate with an upstanding flange 261 on the projecting portion of the gate 148. When the coin dispensing gate 148 is in the open position after an actuation of the means 16 the finger 260 engages the flange 261 during the initial or primary movement of the cam 133 to return the gate 148 to the position where its opening 152 is in register with the opening 149. The latch 220 automatically comes into holding engagement with the gate 148 upon the gate being returned to its normal unactuated position.

It may be desirable to temporarily render the drive 14, the means 15, the control 17 and the associated mechanisms inoperative to permit coins and/or tokens to be fed through the channel 37 and to permit other operations of the coin handling devices without the necessity of actuating the various other parts of the device. A lever 270 is pivoted on the plate 30 and is manually operable to a position where it cooperates with the catch or pawl 91 to prevent the pawl from engaging the arm 90 when the rocker 44 is actuated. By preventing the operative engagement of the pawl 91 with the shaft arm 90 the rocker 44 and parts and mechanisms operatively connected therewith may be actuated without turning the shaft 89. Pivoting of the rocker 44 without turning the shaft 89 causes actuation of the coin advancing means, etc., without causing operation of the drive 14, the wheel stopping means 15 or the control 17. It is to be understood that the lever 270 is normally in a position where it does not interfere with the pawl 91 so that the pawl may properly cooperate with the arm 90 on the shaft.

Optional means may be provided to adapt the machine or amusement device to "pay off" upon disclosing or showing a 7 or 11 at the first play or operation and upon repeating a point 4, 5, 6, 8, 9 or 10 in a single series of plays only when the coin control operating means 11 is conditioned for operation by the insertion of a suitable coin in the chute 33. The optional means permits play or operation of the machine by perforated tokens but prevents a "pay-off" when such tokens are employed. The optional means for governing the pay-off means 16 includes a lever 280 pivotally supported by the pivot pin of the lever 74 and having a laterally extending upper arm carrying a rod 281. The rod 281 extends forwardly and is adapted to be projected through the coin and token passing channel 37. The rod 281 is positioned so that it is forward and may engage the central portion of the coin last inserted in the chute 33. A roller 283 is provided on the lower arm of the lever 280 to cooperate with a cam 284 on the shaft 89. In practice the cam 284 may be a part of a plate of which the arm 250 is an integral part. A spring 285 is connected with the lever 280 to normally tend to operate the lever and project the rod 281 into or through the token and coin passing channel 37. The cam 284 cooperates with the roller 283 to return the lever 280 to a position where the rod 281 is retracted from the channel 37 and is adapted to engage the roller to hold the lever in this inactive or unactuated position. The cam 284 moves out of effective engagement with the roller 283 after the advancing means has advanced the coins and tokens through the channel 37 so that the spring 285 may pivot the lever 280 in the event that the last object inserted in the channel is a perforated coin through which the rod 281 may freely pass. In the event that an imperforate token or coin is inserted in the chute 33 to operate the machine the rod 281 strikes this coin or token when the cam 284 moves out of effective holding engagement with the roller 282 and the lever 280 is thus held against pivoting.

An extension 286 may be removably attached to the lower arm of the lever 280 to cooperate with a pivoted stop 287 on the base 27. The extension 286 may be attached to the lever 280 when it is desired to condition the machine to pay off only when coins are used to operate it. The extension is shown in a reversed position on Fig. 7 where it cannot engage the stop 287. In the following the extension will be considered as turned to its operative position. When the lever 280 pivots upon the rod 281 passing through a perforated token the lever extension 286 moves the stop 287 to a position where it is engageable by a lug 288 on the pay-off gate latch 220 to prevent the release of the latch from the gate. When the stop 287 is moved under the lug 288 by the lever extension 286 it positively prevents the release of the pay-off gate 148 and the paying off of coins or tokens.

The invention includes means for automatically returning the stop 287 to a position out of alignment with the lug 288. A finger 290 is pivotally connected with an arm 291 on the shaft 89. The arm 291 may be integral with the plate of the cam 284 and the arm 250. A spring 292 normally holds the finger 290 in a position where it projects from the arm to engage the pivoted stop 287 if the stop is in position below the lug 288. The pivotal mounting of the finger 290 and the spring 292 permits the finger 290 to ratchet past the stop 287 on the return movement of the shaft 89 in the event that the stop 287 has been advanced under the lug 288 by the lever extension 286. It will be apparent how the finger 290 is adapted to automatically return the stop 287 to an inactive position during the first portion of the play following the actuation of the stop. The lever extension 286 may be readily detached from the lever 280 when the optional means just described is not required or desired or the lever extension 286 may be attached to the lever 280 in a reversed position such as illustrated in Fig. 7 of the drawings where it cannot act on the stop 287.

Under normal conditions and prior to the insertion of a coin or token in the chute 33, the spring urged latch 48 limits movement of the operating handle or lever 43 and the rocker 44 to prevent "unpaid for" operation of the machine. The insertion of a proper coin or token in the chute 33 provides for the release of the latch 48 through the action of the rod 56 and lever 53 so that the player may fully actuate the operating handle or lever 43 to play the machine. The downward and forward movement of the operating handle 43 results in turning of the shaft 89 and reverse pivoting or ratcheting of the yoke 93 over the star wheel 97. During this movement of the yoke 93 the stop 100 prevents undesirable reverse motion of the star wheel and dice wheels 12 and 13. Upon the pawl 91 pivoting out of movement transmitting engagement with the arm 90 at the end of the primary stroke of the rocker 44 the spring 103 suddenly swings the yoke 93 so that its pawl engages a tooth 99 of the star wheel to rotate the star wheel and the dice wheel 12. The pawl 83 cooperates with the lug 84 to cause the dice wheel 13 to be rotated by the dice wheel 12. During the rotation of the wheels 12 and 13 the spring 137 whose action is retarded by the gear mechanism 128 slowly returns the link 139 and the cam 142 on the link pivots the latch controlling lever 124. Slow pivoting of the lever 124 first disengages the latch 120 from the stop finger 106 so that the spring 109 pivots the stop finger to a position where it stops rotation of the star wheel 97 and dice wheel 12. As the nose 107 of the stop finger is capable of cooperating with any of the star wheel teeth 99 the star wheel may be stopped in any one of a multiplicity of different rotative positions. After the star wheel 97 and the dice wheel 12 have been stopped as just described the latch 120 is disengaged from the lever 118 so that the cam 115 engages the clutch causing the dice wheel 13 to be stopped.

Immediately following the stopping of the star wheel 97 the projection 180 on the lever 124 releases the projection 179 to free the rocker 175 so that the triggers 161, 173 and 174 are pivoted by their springs to have their respective fingers come into engagement with the star wheel. If a crap numbers 2, 3, or 12 comes into register with the sight opening 21 with the stopping of the wheels 12 and 13 at the first play, the fingers of the triggers do not encounter or find openings in the star wheel and, therefore, the slide 182 is not released for upward movement and the frame 205 is not pivoted, so that there is no pay-off. Thus, when a crap number 2, 3, or 12 comes up at the sight opening 21 at the first play of the machine there is no pay-off and the latch 48 is not held released to permit successive free plays. In the event that the star wheel 97 stops in a rotative position at the first play where 7 or 11 appears on the dice wheels at the sight opening 21 the finger 165ª enters the opening 172ª or the finger 165ᵇ enters the opening 172ᵇ and the hook 218 on the freed trigger pivots the frame 205 which results in releasing of the latch 220 from the pay-off gate 148 so that two coins or tokens are discharged through the opening 150 to the pay-off opening 23 in the front of the case 10. It is to be noted that the pivoting of the frame 205 by the 7 or 11 triggers at the first play of the machine does not result in releasing of the slide 182 for upward movement and, therefore, does not render the latch 48 inactive for the succeeding play. When the machine pays off upon 7 or 11 being made at the first play, it must be conditioned for further play by inserting a proper coin or token in the chute 33.

If a point combination 4, 5, 6, 8, 9, or 10 appears at the sight opening 21 upon the stopping of the dice wheels 12 and 13 at the first play of the machine, a trigger 161 moves forwardly as its finger 165 enters the opening 172 in the star wheel, the said opening being definitely related to the particular point number appearing at the sight opening 21. The movement of the one freed or released trigger 161 results in pivoting of the latch 188 and releasing of its shoulder 190 from the slide bar 184 allowing the slide 182 to be moved upwardly by its spring. The frame 205 and the member 231 move upwardly together with the slide 182 so that the frame 205 is moved to a position where it cannot be engaged by the hooks 218 while the member 231 assumes the position where it is engageable by the hook 230 of the trigger 173. Upward movement of the slide 182 also results in movement of the slide bolt 192 into engagement with the lever 193 positioning the lever 194 for engagement by the pin 54 so that the latch 48 is automatically released or rendered inoperative for the next succeeding plays or operation. The releasing of the latch 48 in this manner allows the machine to be successively played or operated until the point number is repeated or until 7 appears at the sight opening upon stopping of the wheels 12 and 13 before the making or repeating of the point. The latches 227 automatically render all of the triggers 161 inoperative with the exception of the trigger 161 whose finger 165 enters the opening 172 at the first play. During the first portion of the play following the making of a point at the first play and during the succeeding plays in the same series the various parts of the mechanism are automatically reset, as described above, but the slide 182 and the frame 205 are not returned to their normal or down positions, as the member 231 has not been pivoted to a position where the lever 258 has its cam face 256 engageable by the cam face 255 of the slide resetting arm 254. It will be obvious that the making of the number 11 or a point not made at the first play will not result in pivoting of the frame 205 or the member 231 as the triggers for cooperating with the openings in the star wheel related to these points are held inoperative by the latches 227, and the hook 218 of the number 11 cannot operate the raised member 231. If the point is repeated in a single series of plays before making a 7 the arm 165 of the free trigger 161 enters the opening 172 in the star wheel which is related to the point number at the sight opening 21 and the resultant movement of the trigger 161 pivots the frame 205. The stop 233 causes the member 231 to pivot with the frame 205 so that the lever 234 and the latch 220 are operated to release the pay-off gate 148. Pivoting of the member 231 accompanying the pay-off brings the lever 258 to a position where the resetting arm 254 is pivoted during the first portion of the next operation to engage and return the slide 182. Returning of the slide 182 permits returning of the frame 205 and is accompanied by the releasing of the latch 48 so that a suitable coin or token must be inserted in the chute 33 at the next play or operation of the machine.

In the event that the combination or number 7 appears at the sight opening 21 during the series of plays following the appearance of a point 4, 5, 6, 8, 9 or 10 the arm 165 of a trigger 173 enters an opening 172ª in the star wheel and the resultant pivoting of the trigger 173 causes the hook 230 to pivot the member 231. This pivoting of the member 231 causes movement of the lever 234. Movement of the lever 234 by the member 231 results in retraction of the bolt 192 by its spring 240 so that the lever 194 no longer prevents operation of the latch 48. After this reconditioning of the latch 48 a coin or token must be inserted in the chute 33 to make the machine operative for a succeeding play.

Having described only a typical form and application of the invention, I do not wish to be limited or restricted to the specific form or application herein set forth, but wish to reserve to myself any modifications or variations that may appear to those skilled in the art or fall within the scope of the following claims.

Having described my invention, I claim:

1. In a mechanism of the character described, two independently rotatable wheels, means for rotating one of the wheels, pawl and ratchet means for causing the other wheel to be rotated by the first wheel, and delayed means for stopping the first wheel in any one of a plurality of different rotative positions and then stopping the said other wheel to be in a predetermined rotative position with respect to the first wheel.

2. In a mechanism of the character described, two independently rotatable wheels, means for rotating one of the wheels, pawl and ratchet means for causing the other wheel to be rotated by the first wheel, means for stopping the first wheel in any one of a plurality of different rotative positions and for then stopping the said other wheel to be in a predetermined rotative position with respect to the first wheel, and a control whose action is determined by the rotative position of the stopped wheels.

3. In mechanism of the character described, two independently rotatable wheels, means for rotating one of the wheels, pawl and ratchet means for causing the other wheel to be rotated by the first wheel, means for stopping the first wheel in any one of a plurality of different rotative positions and for then stopping the said other wheel to be in a predetermined rotative position with respect to the first wheel, spring actuated means, and a releasable control latch for the dispensing means, whose action is determined by the rotative position in which the wheels are stopped.

4. In a device of the character described, two elements supported for independent rotation, means for rotating one of the elements, means for causing the other element to be rotated, and means for stopping the elements one after the other in a known rotative position with respect to one another.

5. In a device of the character described, two elements supported for independent rotation, means for rotating one of the elements, means for causing the other element to be rotated with the first element and thereafter permitted to rotate independently of the first element, and means for stopping the elements one after the other in a known rotative position with respect to one another.

6. In a device of the character described, two elements supported for independent rotation, means for rotating one of the elements, means for causing the other element to be rotated, and means for stopping the elements one after the other in a known rotative position with respect to one another, the last mentioned means including a part rotatable with the element that is first stopped and movable into rotation stopping engagement with the second stopped element, and means for moving the part.

7. In a device of the character described, a rotatable element having a plurality of spaced openings, means for stopping the element, members movable into the openings after stopping of the element, and means actuated by movement of one member into an opening to prevent movement of the other members into the openings during subsequent operations of the element.

8. In a device of the character described, two elements supported for independent rotation, means for rotating the elements, means for stopping one element in any one of a plurality of different rotative positions and thereafter stopping the other element to be in a predetermined rotative position with respect to the first element, and a control mechanism whose operation is governed by the rotative position assumed by the elements.

9. In a device of the character described, two elements supported for independent rotation, means for causing independent rotation of the elements, means for stopping the elements in any one of a plurality of different rotative positions to be in the same rotative positions with respect to one another, and a control mechanism governed by the rotative position assumed by the elements.

HARRY P. MAY.